United States Patent
Zhang

(10) Patent No.: US 9,254,573 B2
(45) Date of Patent: Feb. 9, 2016

(54) FEEDING MECHANISM

(71) Applicants: HONG FU JIN PRECISION INDUSTRY (Shenzhen) CO., LTD., Shenzhen (CN); HON HAI PRECISION INDUSTRY CO., LTD., New Taipei (TW)

(72) Inventor: Cheng Zhang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 104 days.

(21) Appl. No.: 14/103,839

(22) Filed: Dec. 11, 2013

(65) Prior Publication Data
US 2014/0174887 A1     Jun. 26, 2014

(30) Foreign Application Priority Data
Dec. 22, 2012   (CN) .......................... 2012 1 05618247

(51) Int. Cl.
| | | |
|---|---|---|
| *B65G 17/20* | (2006.01) | |
| *B65G 47/00* | (2006.01) | |
| *B25J 15/06* | (2006.01) | |
| *B25J 15/00* | (2006.01) | |

(52) U.S. Cl.
CPC .......... *B25J 15/0608* (2013.01); *B25J 15/0052* (2013.01)

(58) Field of Classification Search
None
See application file for complete search history.

(56) References Cited

U.S. PATENT DOCUMENTS

| | | | |
|---|---|---|---|
| 3,826,485 A | 7/1974 | Shindo | |
| 5,865,487 A * | 2/1999 | Gore ......................... | B25J 15/06 294/2 |
| 7,611,180 B1 * | 11/2009 | Fisher .................. | B25J 15/0052 294/65 |
| 2006/0043747 A1 * | 3/2006 | Kniss ..................... | B25J 13/086 294/65 |
| 2012/0145682 A1 * | 6/2012 | Yeum ................... | B23K 26/032 219/121.63 |

* cited by examiner

*Primary Examiner* — Kavel Singh
(74) *Attorney, Agent, or Firm* — Novak Druce Connolly Bove + Quigg LLP

(57) ABSTRACT

A feeding mechanism includes a supporting bracket; assembled to the supporting bracket; and a handling assembly. The handling assembly includes a pair of first handling subassemblies and a pair of first handling subassemblies. Each first handling subassembly includes a first guiding rod, a first elastic member, and a first handling member. The first guiding rod is slidably mounted on the supporting bracket, the first handling member is connected to the first guiding rod and the second guiding rod, the first elastic member is resisted between the first handling member and the supporting bracket. The second handling subassembly has a structure same as the first handling subassembly except that the guiding rod of the second handling subassembly has a length greater than that of the first guiding rod. The driving assembly is configured for driving the first handling member and the second handling member toward the supporting bracket.

20 Claims, 4 Drawing Sheets

FEEDING MECHANISM

BACKGROUND

1. Technical Field

The present disclosure relates to a feeding mechanism, and more particularly, to a feeding mechanism employed in production line.

2. Description of Related Art

In manufacturing, a plurality of workpieces is laminated together. When in use, a feeding mechanism is employed to separate the plurality of workpieces and picks up the workpiece one by one. However, a negative pressure is easily generated between adjacent two workpieces, thus the workpieces are difficult to be separated by the feeding mechanism, thereby reducing a separation efficiency and a picking up efficiency.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
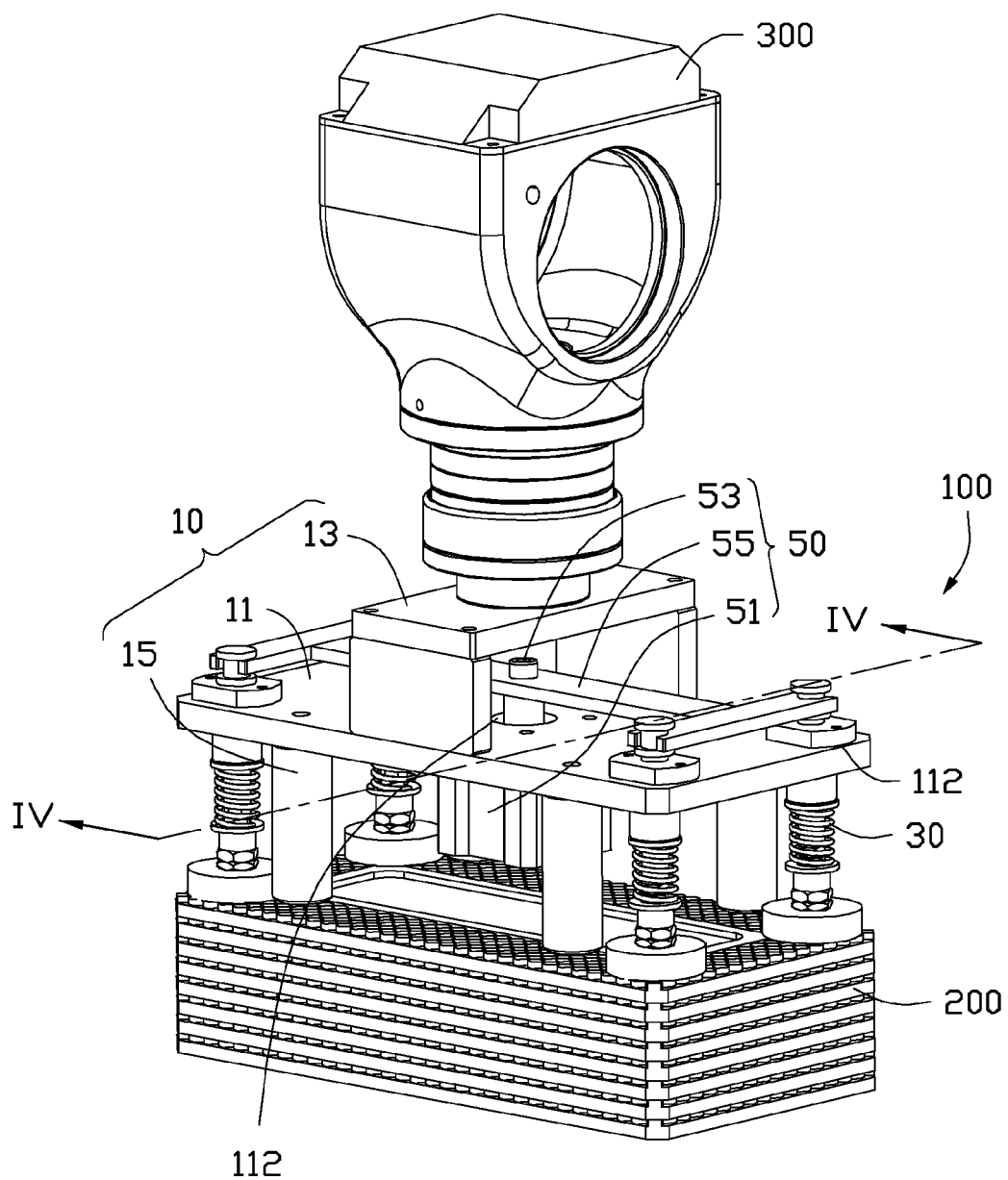
FIG. 1 is an isometric view of an embodiment of a feeding mechanism when in use.

FIG. 1 shows an embodiment of a feeding mechanism 100 to separate a plurality of workpieces 200 and feed the workpiece 200 to a next workstation one by one. In the illustrated embodiment, the workpieces 200 are magnets each having roughness pattern on a top surface. The feeding mechanism 100 includes a supporting bracket 10, a handling assembly 30, and a driving assembly 50. The handling assembly 30 is assembled to the supporting bracket 10 for clamping the workpiece 200, the driving assembly 50 is assembled to the supporting bracket 10 and connected to the handling assembly 30. The driving assembly 50 drives the handling assembly 30 toward the supporting bracket 10, to enable the support bracket 10 to block the workpieces 200, thereby removing the workpieces 200 away from the handling assembly 100.

The supporting bracket 10 includes a base portion 11, a connecting portion 13 on a side of the base portion 11, and two blocking portions 15 on another side of the base portion 11 opposite to the connecting portion 13. The base portion 11 is substantially a rectangular plate, and defines four first inserting holes 112 on four corners and a second inserting hole 113 at a middle portion. The connecting portion 13 is located above the second inserting hole 113, and configured to be assembled to a robot arm 300.

Figure 2:
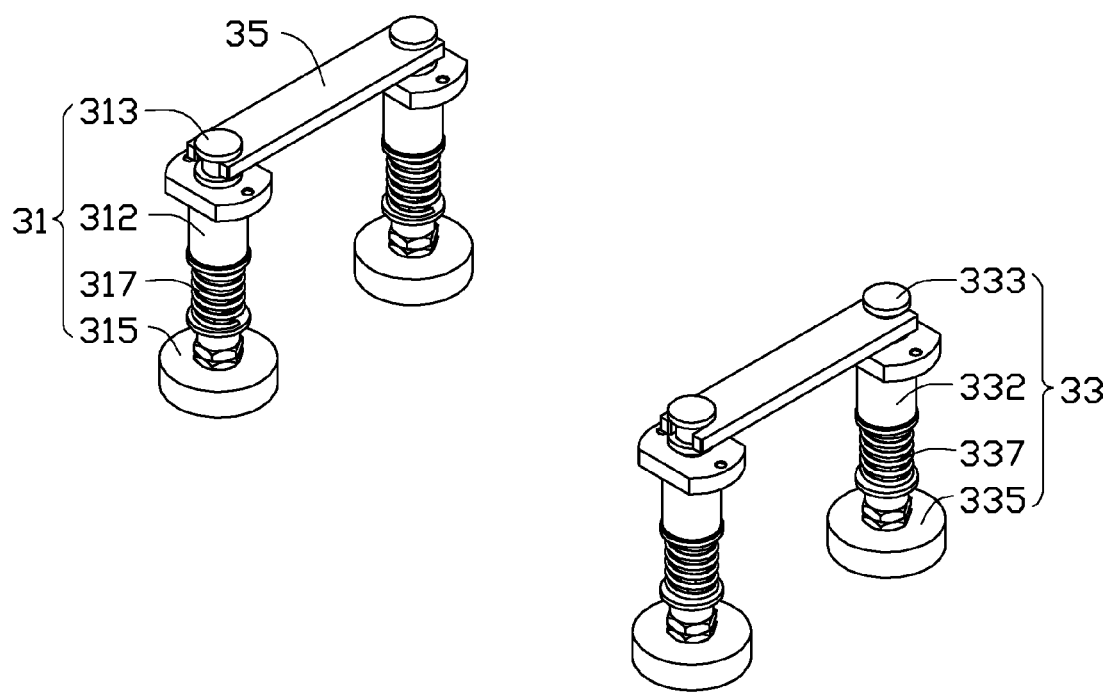
FIG. 2 is a handling assembly of the feeding mechanism of FIG. 1.
Figure 3:
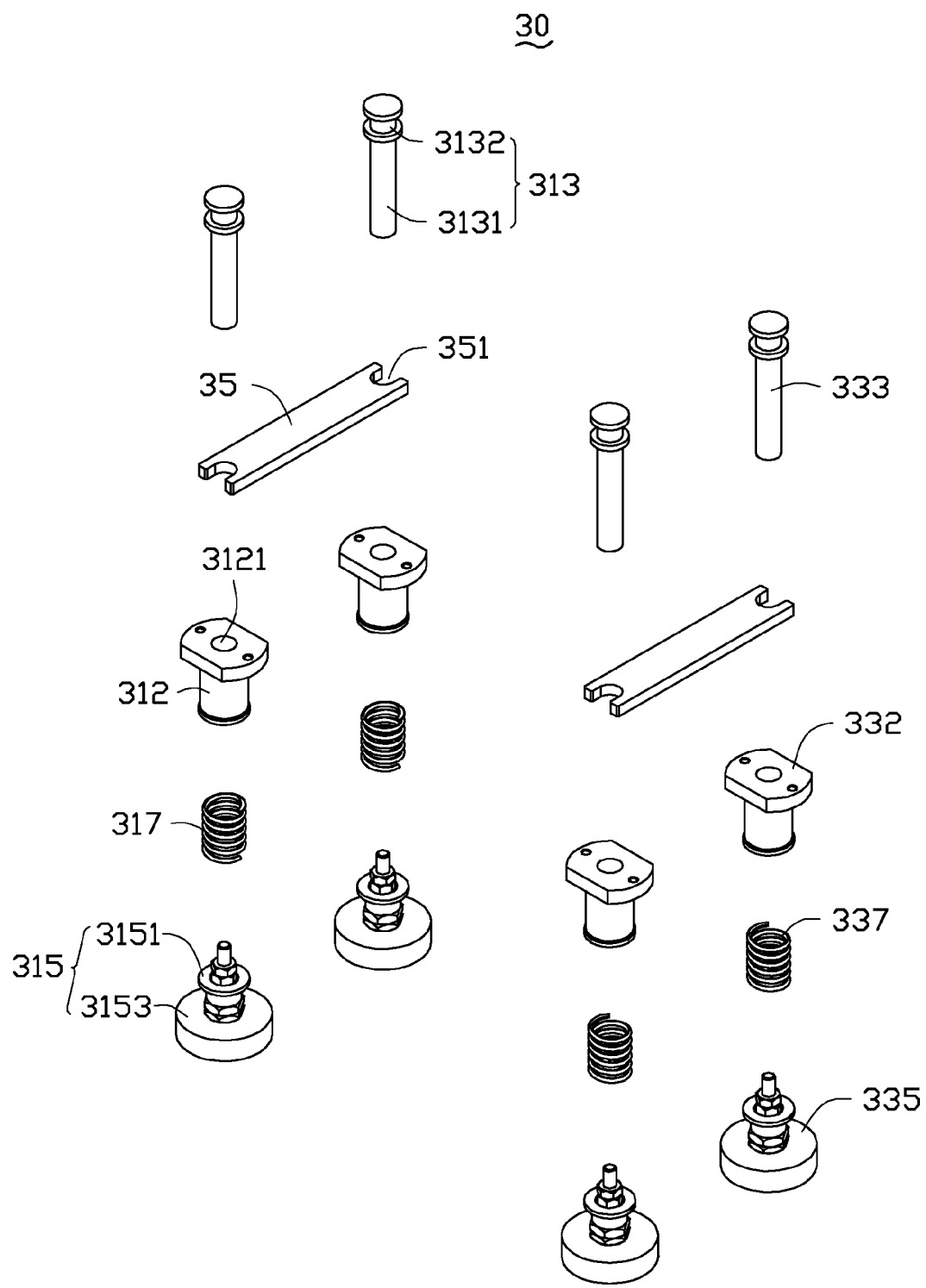
FIG. 3 is an exploded, isometric view of the handling assembly of FIG. 2.
Figure 4:
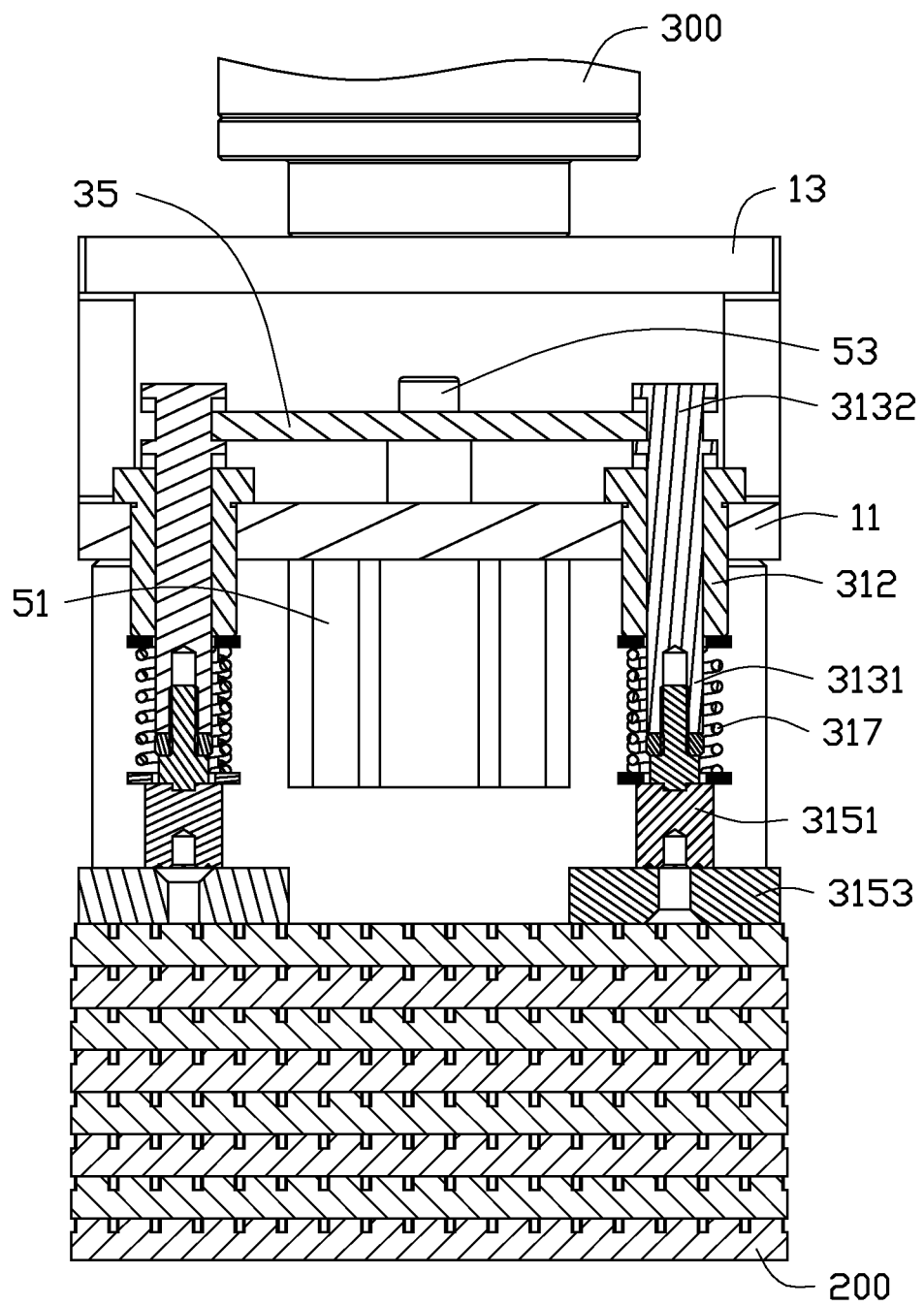
FIG. 4 is a cross-sectional view of the feeding mechanism of FIG. 1, taken along line IV-IV.

FIGS. 2 through 4 show that, the handling assembly 30 is assembled to the base portion 11 of the supporting bracket 10. The handling assembly 30 includes a pair of first handling subassemblies 31, a pair of second handling subassemblies 33, and a pair of connecting members 35. The pair of first handling subassemblies 31 and the pair of second handling subassemblies 323 are separately assembled into the four first inserting holes 112. One connecting member 35 interconnects the pair of first handling subassemblies 31, the other connecting member 35 interconnects the pair of second handling subassemblies 33.

Each first handling subassembly 31 includes a first fixing member 312, a first guiding rod 313, a first handling member 315, and a first elastic member 317. The first fixing member 312 is fittingly inserted through corresponding one first inserting hole 112, and axially defines a guiding hole 3121. The first guiding rod 313 includes a main body 3131 and a latching portion 3132 protruding from an end of the main body 3131. The main body 3131 extends through the guiding hole 3121 of the first fixing member 312, and opposite ends of the main body 3131 exposes out of the guiding hole 3121. The first handling member 315 includes a base body 3151 and a handling portion 3153 connected to an end of the base body 3151. The base body 3151 is fixed to the end of the main body 3131 of the first guiding rod 313 away from the latching portion 3132. In the embodiment, the base body 3151 is a floating coupler; the handling portion 3153 is a magnetic member. The first elastic member 317 is sleeved on the main body 3131 of the first guiding rod 313. Opposite ends of the first elastic member 317 resists the base body 3151 of the first handling member 315 and the first fixing member 312.

Each second handling subassembly 33 has a structure similar to the first handling subassembly 31, including a second fixing member 332, a second guiding rod 333, a second handling member 335, and a second elastic member 337. The difference between the second handling subassembly 33 and the first handling subassembly 31 is that, a length of the second guiding rod 333 is greater than that of the first guiding rod 313. In the embodiment, the first guiding rod 313 and the second guiding rod 333 are arranged parallel to the two blocking portions 15. Each connecting member 35 is substantially in a rectangular trip shape, and defines a pair of cutouts 351 at opposite ends thereof. The pair of cutouts 351 of one connecting member 35 latches with the latching portions 3132 of the pair of first guiding rods 313, and thereby interconnecting the pair of first handling subassemblies 31. The pair of cutouts 351 of the other one connecting member 35 latches with the latching portions 3132 of the pair of second guiding rods 333, and thereby interconnecting the pair of second handling subassemblies 33.

The first handling member 315 and the second handling member 335 may be in other shapes. When the workpieces 200 has a planar surface, the first handling member 315 and the second handling member 335 may be suction cups to suctioning the planar surfaces of the workpiece 200. The first handling member 315 and the second handling member 335 may be clamping jaws for easily clamping the workpiece 200.

FIGS. 1 and 4 show that the driving assembly 50 is assembled to the base portion 11 of the support bracket 10. The driving assembly 50 includes a driving body 51, an output shaft 53, and a driving rod 55. The driving body 51 is assembled to a side of the base portion 11 away from the connecting portion 13. The driving body 51 is arranged below the second inserting hole 113 and is aligned with the second inserting hole 113. The output shaft 53 is connected to the driving body 51 and partially received in the second inserting hole 113. An end of the output shaft 53 exposes out of the second inserting hole 113, and is located between the pair of connecting members 35. The driving rod 55 is connected to the output shaft 53 by a middle portion, and opposite ends of the driving rod 55 are connected to the pair of connecting members 35. The driving body 51 drives the output shaft 53 to push the driving rod 55. The driving rod 55 drives the pair of connecting members 35 to pull the handling assembly 30 to move relative to the supporting bracket 10.

When in assembly, the first fixing member 312 extends through the first inserting hole 112. The main body 3131 of the first guiding rod 313 slidably extends through the guiding hole 3121 of the first fixing member 312, and partially exposes out of the first fixing member 312. The base body 3151 of the first handling member 315 is connected to an end of the main body 3131 of the first guiding rod 313 away from the latching portion 3132. The first elastic member 317 is sleeved on the main body 3131 of the first guiding rod 313, opposite ends of the first elastic member 317 resists the base body 3151 and the first fixing member 312. The pair of first guiding rods 313 is assembled to opposite ends of one connecting member 35. Similarly, the second handling subassembly 33 is assembled to the other connecting member 35. The driving body 51 is assembled to a side of the base portion 11 away from the connecting portion 13. The driving body 51 is arranged below the second inserting hole 113 and is aligned to the second inserting hole 113. The output shaft 53 is connected to the driving body 51 and is partially received in the second inserting hole 113. An end of the output shaft 53 exposes out of the second inserting hole 113. The driving rod 55 is connected to the output shaft 53, and opposite ends of the driving rod 55 are connected to the pair of connecting members 35.

When in use, the feeding mechanism 100 is assembled to the robot arm 300 and is driven by the robot arm 300 toward the workpiece 200 on a top. Due to the length of the gap and the length of the second guiding rod 333 is greater than that of the first guiding rod 313, the pair of second handling members 335 first resist an edge of the workpiece 200. The pair of second fixing members 332 compresses the pair of elastic members 317 and slides relative to the pair of guiding rods 333 toward the workpiece 200. Then the pair of first handling member 315 arrives at and resists an opposite edge of the workpiece 200. The pair of first handling members 315 and the pair of second handling members 335 are suctioned to opposite edges of the workpiece 200. The robot arm 300 pulls the feeding mechanism 100 away from the workpiece 200. The pair of first handling members 315 pulls an edge of the workpiece 200 upwardly. At the same time, the pair of second elastic members 337 releases to enable the pair of second handling members 335 to remain still. A negative pressure between the workpiece 200 and a lower workpiece 200 is eliminated. When the pair of elastic members 337 are released, the pair of second handling members 335 pulls edges of the workpiece 200 upwardly. The robot arm 300 handles the feeding mechanism 300 together with the workpiece 200 to a next workstation. Then, the driving body 51 drives the driving rod 55 upwardly via the output shaft 53. The handling assembly 30 moves relative to the support bracket 10, and drags the workpiece 200 toward the support bracket 10. The blocking portions 15 that are adjacent to first handling subassembly 31 block the workpiece 200. Then the workpiece 200 is blocked by the blocking portions 15 that are adjacent to second handling subassembly 33, and departs from the feeding mechanism 100.

The first handling subassembly 31 and the second handling subassembly 33 are employed to orderly pull opposite edges of the workpiece 200. Due to a length gap between the first guiding rods 313 and the second guiding rods 333, the edge of the workpiece 200 pulled by the first handling subassembly 31 moves upwardly first, the negative pressure between the workpiece 200 and a lower workpiece 200 is eliminated. When the second elastic members 337 are released, the second handling subassembly 33 pulls the edge of the workpiece 200 to separate the workpiece 200 from the lower workpiece 200. Such that the workpieces 200 are easily separated by the feeding mechanism 100 one by one. An efficiency of separation and an efficiency of feeding are enhanced.

When the first guiding rods 313 and the second guiding rods 333 slidably extend through the first inserting holes 112, and the first elastic members 317 directly resist the first handling members 315 and the support bracket 10. The second elastic member 337 directly resists the second handling members 335 and the support bracket 10. The first fixing members 312 and the second fixing members 332 may be omitted. The first elastic members 317 may be omitted.

When the driving rod 55 is connected to the first pair of handling subassemblies 31 and the pair of second handling subassemblies 33 directly, the connecting member 35 may be omitted. The number of the blocking portions 15, the first handling subassemblies 31, the second handling subassemblies 33, and the first inserting holes 112 are not limited to above-mentioned, but also may be changed according to a requirement, such as one or a plurality.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A feeding mechanism, comprising:
   a supporting bracket;
   a driving assembly assembled to the supporting bracket; and
   a handling assembly, comprising:
      at least one first handling subassembly comprising a first guiding rod, a first elastic member, and a first handling member; and
      at least one second handling subassembly comprising a second guiding rod, a second elastic member, and a second handling member, wherein the first guiding rod and the second guiding rod are slidably mounted on the supporting bracket, and the second guiding rod has a length greater than that of the first guiding rod, the first handling member and the second handling member are respectively connected to the first guiding rod and the second guiding rod, the first elastic member is sleeved on the first guiding rod, and opposite ends of the first elastic member are resisted between the first handling member and the supporting bracket, the second elastic member is sleeved on the second guiding rod, and opposite ends of the second elastic member are resisted between the supporting bracket and the second handling member, the driving assembly is connected to the first guiding rod and the second guiding rod, and is capable of driving the first handling member and the second handling member to move along a direction toward the supporting bracket substantially parallel to the first guiding rod and the second guiding rod.

2. The feeding mechanism of claim 1, wherein the at least one first handling subassembly further comprises a first fixing member fittingly inserted through the supporting bracket, and defines a guiding hole axially, the first guiding rod extends through the guiding hole of the first fixing member, and opposite ends of the first guiding rod extend out of the guiding hole, the opposite ends of the first elastic member resist the first handling member and the first fixing member, the at least one second handling subassembly comprises a second fixing member, and the second fixing member has a structure same as the first fixing member.

3. The feeding mechanism of claim 2, wherein the supporting bracket comprises a base portion, and the base portion defines at least two first inserting holes thereon, the at least two inserting holes are spaced from each other, the first fixing member and the second fixing member extend through the at least two first inserting holes respectively.

4. The feeding mechanism of claim 3, wherein the base portion further comprises at least one blocking portion on a side of the base portion adjacent to the handling assembly, and the blocking portion is parallel to the first guiding rod and the second guiding rod.

5. The feeding mechanism of claim 1, wherein the handling assembly comprises a pair of first handling subassemblies, a pair of second subassemblies, and a pair of connecting members, one of the pair of connecting members interconnects the first guiding rods of the pair of first handling subassemblies, the other of the pair of connecting members interconnects the second guiding rods of the pair of second handling subassemblies, and the driving assembly is capable of driving the pair of connecting members to move along the direction toward the supporting bracket substantially parallel to the first guiding rod and the second guiding rod.

6. The feeding mechanism of claim 5, wherein the first guiding rod comprises a main body and a latching portion protruding from an end of the main body, the main body extends through supporting bracket, an end of the main body away from the latching portion is connected to the first handling member, the second guiding rod has a structure same as the first guiding rod, each connecting member defines a pair of cutouts at opposite ends thereof, the pair of cutouts of one connecting member latch with the latching protons of the pair of first guiding rods, and the pair of cutouts of the other connecting member latch with the latching portions of the pair of second guiding rods.

7. The feeding mechanism of claim 6, wherein the driving assembly comprises a driving body, an output shaft, and a driving rod, the driving body is assembled to the supporting bracket; the output shaft is connected to the driving body and exposes out of the supporting bracket, the driving rod is connected to the output shaft, and opposite ends of the driving rod are connected to the pair of connecting members.

8. The feeding mechanism of claim 1, wherein the first handling member comprises a base body and a handling portion connected to an end of the base body, the base body is fixed to an end of the first guiding rod away from the supporting bracket.

9. The feeding mechanism of claim 8, wherein the handling portion is magnetic.

10. The feeding mechanism of claim 8, wherein the handling portion is a clamping jaw.

11. A feeding mechanism, comprising:
a supporting bracket;
a driving assembly assembled to the supporting bracket; and
a handling assembly, comprising:
a pair of first handling subassemblies each comprising a first guiding rod and a first handling member; and
a pair of second handling subassemblies each comprising a second guiding rod, a second elastic member, and a second handling member;
wherein the first guiding rods and the second guiding rods are slidably mounted on the supporting bracket, and the second guiding rods have lengths greater than that of the first guiding rods, each first handling member and each second handling member are respectively connected to the first guiding rod and the second guiding rod, each second elastic member is resisted between the supporting bracket and one of the pair of second handling members, the driving assembly is connected to the first guiding rods and the second guiding rods, and configured for driving the pair of first handling subassemblies and the pair of second handling subassemblies to move along a direction toward the supporting bracket substantially parallel to the first guiding rods and the second guiding rods.

12. The feeding mechanism of claim 11, wherein each first handling subassembly further comprises a first elastic member, and a first fixing member fittingly inserted through the supporting bracket, and the first fixing member defines a guiding hole axially, the first guiding rod extends through the guiding hole of the first fixing member, and opposite ends of first guiding rod extend out of the guiding hole, the first elastic member is sleeved on first guiding rod, and opposite ends of the first elastic member resist the first handling member and the first fixing member, the at least one second handling subassembly comprises a second fixing member, the second fixing member has a structure same as the first fixing member.

13. The feeding mechanism of claim 12, wherein the supporting bracket comprises a base portion, and the base portion defines at least two first inserting holes thereon, the at least two first inserting holes are spaced from each other, the first fixing member and the second fixing member extends through the at least two first inserting holes respectively.

14. The feeding mechanism of claim 13, wherein the base portion further comprises at least one blocking portion on a side of the base portion adjacent to the handling assembly, and the blocking portion is parallel to the first guiding rods and the second guiding rods.

15. The feeding mechanism of claim 11, wherein the handling assembly further comprises a pair of connecting members, one of the pair of connecting members interconnects the first guiding rods of the pair of first handling subassemblies, the other of the pair of the connecting members interconnects the second guiding rods of the pair of second handling subassemblies, and the driving assembly is capable of driving the pair of connecting members.

16. The feeding mechanism of claim 15, wherein the first guiding rod comprises a main body and a latching portion protruding from an end of the main body, the main body extends through supporting bracket, an end of the main body away from the latching portion is connected to the first handling member, the second guiding rod has a structure same as the first rod, each connecting member defines a pair of cutouts at opposite ends thereof, the pair of cutouts of one connecting member latch with the latching protons of the pair of first guiding rods, and the pair of cutouts of the other one connecting member latch with the latching protons of the pair of second guiding rods.

17. The feeding mechanism of claim 16, wherein the driving assembly comprises a driving body, an output shaft, and a driving rod, the driving body is assembled to the supporting bracket; the output shaft is connected to the driving body and exposes out of the supporting bracket, the driving rod is connected to the output shaft, and opposite ends of the driving rod are connected to the pair of connecting members.

18. The feeding mechanism of claim 11, wherein the first handling member comprises a base body and a handling portion connected to an end of the base body, and the base body is fixed to an end of the first guiding rod away from the supporting bracket.

19. The feeding mechanism of claim 18, wherein the handling portion is magnetic.

20. The feeding mechanism of claim 18, wherein the handling portion is a clamping jaw.

* * * * *